(12) United States Patent
Schmitz et al.

(10) Patent No.: US 6,539,224 B2
(45) Date of Patent: *Mar. 25, 2003

(54) METHOD FOR CONTROLLING THE LOGON OF CORDLESS MOBILE PARTS AT CORDLESS BASE STATIONS OF UNIVERSAL MOBILE TELECOMMUNICATION SYSTEMS, PARTICULARLY OF DECT MOBILE PARTS AT DECT BASE STATIONS OF CAP-SPECIFIC TELECOMMUNICATION SYSTEMS

(75) Inventors: Georg Schmitz, Bocholt (DE); Erich Kamperschroer, Hamminkeln (DE); Martin Kordsmeyer, Hörstel (DE); Michael Beckers, Bocholt (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/297,032
(22) PCT Filed: Oct. 10, 1997
(86) PCT No.: PCT/DE97/02323
§ 371 (c)(1),
(2), (4) Date: Apr. 21, 1999
(87) PCT Pub. No.: WO98/18275
PCT Pub. Date: Apr. 30, 1998

(65) Prior Publication Data
US 2001/0041558 A1 Nov. 15, 2001

(30) Foreign Application Priority Data
Oct. 22, 1996 (DE) .......................................... 196 43 658

(51) Int. Cl.[7] ................................................ H04Q 7/20
(52) U.S. Cl. ........................ 455/435; 455/411; 455/433; 455/74.1
(58) Field of Search ................................ 455/74.1, 435, 455/561, 410, 411, 432, 433

(56) References Cited

U.S. PATENT DOCUMENTS

| | | | |
|---|---|---|---|
| 4,992,783 A | | 2/1991 | Zdunek et al. |
| 5,282,250 A | | 1/1994 | Dent et al. |
| 5,390,245 A | | 2/1995 | Dent et al. |
| 5,509,052 A | | 4/1996 | Chia et al. |
| 5,559,886 A | | 9/1996 | Dent et al. |
| 5,734,977 A | * | 3/1998 | Sanmugam .................. 455/410 |
| 5,748,742 A | * | 5/1998 | Tisdale et al. ............... 380/249 |
| 5,978,669 A | * | 11/1999 | Sanmugam .................. 455/410 |

FOREIGN PATENT DOCUMENTS

| | | |
|---|---|---|
| DE | 195 42 732 A1 | 5/1997 |
| EP | 0 336 079 A2 | 10/1989 |
| EP | 0 447 380 A1 | 9/1991 |
| GB | 2 289 828 A | 11/1995 |
| WO | WO 93/21719 | 10/1993 |
| WO | WO 94/10785 | 5/1994 |
| WO | WO 95/05040 | 2/1995 |

OTHER PUBLICATIONS

IEEE Communications Magazine, Jan. 1995, David D. Falconer et al, Time Division Multiple Access Methods for Wireless Personal Communications, pp. 50–57.

(List continued on next page.)

Primary Examiner—Edward F. Urban
Assistant Examiner—Temica M. Davis
(74) Attorney, Agent, or Firm—Bell Boyd & Lloyd LLC

(57) ABSTRACT

In order to re-log cordless mobile parts on at cordless base stations of universal mobile telecommunication systems, particularly DECT mobile parts at DECT base stations of CAP-specific telecommunication systems, without great outlay the stored, logon-specific data resulting from a preceding logon is copied. The copied data is subsequently at least partly processed. The copied, at least partly processed data is stored as re-logon-specific data.

4 Claims, 2 Drawing Sheets

OTHER PUBLICATIONS

DECT/GAP standard (Digital European Cordless Telecommunication; cf. (1): Nachrichtentechnik Elektronik 42 (1992) Jan./Feb. No. 1, Berlin, DE; U. Pilger "Struktur des DECT–Standards," pp. 23–29.

Telcom Report 16 (1993), No. 1, J. H. Koch: "Digitaler Komfort für schnurlose Telekommunikation—DECT–Standard eröffmet neue Nutzungsgebiete", pp. 26–27.

tec 2/93—Das technische Magazin von Ascom "Wege zur universellen mobilen Telekommunikation", pp. 35 to 42.

Philips Telecommunication Review, R. J. Mulder, "DECT, a universal cordless access system", pp. 68–73.

ETSI—Publication, Oct. 1992, ETS 300175 1 . . . 9, Part 1: Overview, pp. 1–30; Part 2: Physical layer pp. 1–39; Part 3: Medium access control layer, pp. 1–197; Part 4: Data link control layer, pp. 1–128; Part 5: Network layer, pp. 1–241; Part 6: Identities and addressing, pp. 1–41; Part 7: Security features, pp. 1–104; Part 8: Speech coding and transmission, pp. 1–39; Part 9: Public access profile, pp. 1–71.

ETSI–Publication, Draft Version, 1.10, Sep. (1995), In Architecture and Functionality for the support of CTM, pp. 1–30.

ETSI–Publication, Draft DE/NA–010039, Version 6, Oct. (1995), Phase 1, Service Description, Cordless Terminal Mobility (CTM), pp. 1–34.

Publication, A. Elberse et al, DECT Cata Services, "DECT in Fixed and Mobile Networks", Jun. (1996), pp. 1–12.

ETSI—Publication prETS 300xxx, Version 1.10, Sep. (1996), pp. 1–117.

Nachrichtentech, Elektron, Berlin, vol. 41, (1991) Werner Baerwald, "Schnittstellen in der Telekommunikation Teil 1: Standardisierung in der Telekommunikation—ein Überlick", pp. 99–102; Teil 2: pp. 138–143; Teil 3: pp. 179–182; Teil 3 (Schluss): pp. 219–222; Teil 4: pp. 19–20; Teil 5: pp. 59–61; Teil 5 (Schluss): pp. 99–102; Teil 6: pp. 150–153; Teil 7: pp. 238–241; Teil 8: pp. 29–33; Teil 9: pp. 95–97; Teil 9: pp. 129–135; & Teil 10: pp. 187–190.

Informatik Spektrum 14, Jun. 1991, No. 3, Berlin, A. Mann, "Der GSM–Standard—Grundlage für dugutake europäische Mobilfunknetze", pp. 137–152.

ETSI—Publication, Apr. 1995, prETS 300444, Generic Access Profile, pp. 1–129.

\* cited by examiner

METHOD FOR CONTROLLING THE LOGON OF CORDLESS MOBILE PARTS AT CORDLESS BASE STATIONS OF UNIVERSAL MOBILE TELECOMMUNICATION SYSTEMS, PARTICULARLY OF DECT MOBILE PARTS AT DECT BASE STATIONS OF CAP-SPECIFIC TELECOMMUNICATION SYSTEMS

In message systems with a message transmission link between a message source and a message sink, transmission and reception devices are employed for message processing and transmission, whereby the message processing and message transmission can ensue in a privileged transmission direction (simplex mode) or in both transmission directions (duplex mode). The message processing is analog or digital. The message transmission over the long-distance transmission link is wire-bound or ensues wirelessly on the basis of various message transmission methods FDMA (Frequency Division Multiple Access), TDMA (Time Division Multiple Access) and/or CDMA (Code Division Multiple Access)—for example according to radio standards such as DECT, GSM, WACS or PACS, IS-54, PHS, PDC, etc. see IEEE Communications Magazine, January 1995, pages 50 through 57; D. D. Falconer et al., "Time Division Multiple Access Methods for Wireless Personal Communication".

"Message" is a higher-ranking term that stands both for the denotational content (information) as well as for the physical representation (signal). Different signal forms can occur despite the same denotational content of a message—i.e., the same information. Thus, for example, a message relating to a subject matter can be transmitted in the following forms.

(1) an image,
(2) spoken word,
(3) written word,
(4) encrypted word or image.

The type of transmission according to 1 . . . 3, is thereby normally characterized by continuous (analog) signals, whereas discontinuous signals (for example, pulses, digital signals) generally arise in the type of transmission according to form 4.

Proceeding from this general definition of a message system, the present invention is directed to a method for controlling the logon of cordless mobile parts at cordless base stations of universal telecommunication systems, particularly DECT mobile parts at DECT base stations of CAP-specific telecommunication systems.

International application WO 95/05040 shows and describes (FIGS. 3 through 8 with the respectively appertaining description) a scenario for a "Universal Mobile Telecommunication System" (UMTS), which is essentially concerned with involving picocell-related cordless telecommunication systems for example (I): DECT systems; Digital Enhanced Cordless Telecommunication, (see (1): *Nachrichtentechnik Elektronik* 42 (1992), January/February, No. 1, Berlin, D E, U. Pilger "*Struktur des DECT-Standards*", pages 23 through 29 in combination with *ETSI Publication ETS* 300175-1 . . . 9, October 1992; (2): *Telcom Report* 16 (1993), No. 1, J. H. Koch, "*Digitaler Komfort für schnurlose Telecommunication—DECT-Standard eröffnet neue Nutzungsgebiete*", pages 26 and 27; (3): tec February 1993—Das technische Magazin von Ascom "*Wege zur universellen mobilen Telecommunication*", pages 35 through 42; (4): *Philips Telecommunication Review*, Vol. 49, No. 3, September 1991, R. J. Mulder, "*DECT, a universal cordless access system*"; (5): WO 93/21719 (FIGS. 1 through 3 with appertaining description); and (II): DECT/GAP systems; Generic Access Profiles (see *ETSI Publication prETS* 3000444, April 1995, Final Draft) in to a higher-ranking network infrastructure for example ISDN, PSTN, GSM and/or satellite networks; Integrated Services Digital Network, (see the publication "*Nachrichtentechnik Elektronik*, Berlin 41–43, Part: 1 through 10, P1: (1991) No. 3, pages 99 through 102; P2: (1991) No. 4, pages 138 through 143; P3: (1991) No. 5, pages 179 through 182 and No. 6, pages 219 through 220; P4: (1991) No. 6, pages 220 through 222 and (1992) No. 1, pages 19 through 20; P5: (1992) No. 2, pages 59 through 62 and (1992) No. 3, pages 99 through 102; P6: (1992) No. 4, pages 150 through 153; P7: (1992) No. 6, pages 238 through 241; P8: (1993) No. 1, pages 29 through 33; P9: (1993) No. 2, pages 65 through 97 and (1993) No. 3, pages 129 through 135; P10: (1993) No. 4, pages 187 through 190;") Public Switched Telecommunication Network, Global System for Mobile Communication (see *Informatik Spektrum* 14 (1991) June, No. 3, Berlin, D E, A. Mann, "*Der GSM-Standard—Grundlage für digitale europäische Mobilfunknetze*", pages 137 through 152 for accesses (see *ETSI Publication* "CTM Access Profile (CAP)" prETS 300XXX, September 1996) under CTM points of view (Cordless Terminal Mobility; see ETSI Publications (1): "*IN Architecture and Functionality for the support of CTM*", Draft Version 1.10, September 1995; (2): "*Cordless Terminal Mobility (CTM) —Phase 1, Service Description*", Draft DE/NA-010039, Version 6, Oct. 2, 1995).

This can be achieved by a DECT base station fashioned as DECT repeater. In a universal mobile telecommunication system, DECT is mainly understood as a "network access technology" for mobile communication services (see publication (presentation) of A. Elberse, M. Barry, G. Fleming on the topic, "*DECT Data Services—DECT in Fixed and Mobile Networks*", Jun. 17/18, 1996, Hotel Sofitel, Paris, pages 1 through 12 and Summary) and not as a network.

International application WO 94/10785 discloses a method for the interconnection of transmission and reception devices of a cordless communication system to form a communication-capable unit, whereby cordless mobile parts are logged on at cordless base stations by logon procedures sequencing via air interfaces according to an air interface-specific protocol, and whereby logon-specific data are stored in the cordless mobile parts during this logon (FIGS. 4 through 12 with the respectively appertaining figure description).

In the framework of the CTM access profile (CAP) standardized by ETSI, it is intended that the fixed part (Fixed Part; for example the DECT base station) can, as needed, modify access authorization-specific parameters for example, the IPUI identification (International Portable User Identification; see *ETSI Publication ETS* 300175-6, October 1992, Ch. 6.2), the PARK identifier (Portable Access Rights Key; see *ETSI Publication ETS* 300175-6, October 1992, Ch. 6.1) and the PLI identifier (Park Length Indicator; see ETSI Publication ETS 300175-6, October 1992, Ch. 6.1) that are stored in a non-volatile memory (for example, EEPROM) in the mobile part (Portable Part PP; for example, the DECT mobile part) already logged on at the fixed part (see WO 94/10785). To that end, the fixed part initiates a re-logon procedure (re-subscription procedure) according to FIG. 1. According to the DECT standard (see *ETSI Publication* 300175-5, October 1992), the sub-procedures shown in FIG. 1, "authentification of the fixed part" (see *ETSI Publication ETS* 300175-5, October 1992, Ch. 13.3.3), "key allocation" (see ETSI Publication ETS 300175-5, October 1992, Ch. 13.6) and "authentification of the mobile part" (see ETSI Publication ETS 300175-5, October 1992, Ch. 13.3.1), are thereby implemented with the MM messages recited in ETS 300175-5, October 1992, Ch. 6.3.6 With the sub-procedure "authentification of the fixed part", the fixed part FP must legitimize or, respectively, identify itself as fixed part that is authorized to initiate a re-subscription procedure. What this is particularly intended to prevent is that unauthorized persons ("hackers") can initiate a re-subscription procedure from an arbitrary fixed part. The access rights according to ETS 300175-5, October 1992, Ch. 13.5.1 are assigned with the sub-procedures of "key allocation" and "authentification of the mobile part".

Up to now, it was standard that the data (for example, the afore-mentioned identifications) stored in the preceding logon were all deleted—both in the fixed part FP as well as in the mobile part PP. The result thereof was that the logon procedure, i.e. all sub-procedures shown in FIG. 1, had to be completely repeated.

European reference EP-0 336 079 A2 and Great Britain reference GB-2 289 828 A respectively disclose a method for controlling the logon of cordless mobile parts at cordless base stations of universal telecommunication systems wherein a personal identifier (password, ID) stored in the cordless mobile part can be modified, in particular, on demand by the cordless base station.

German reference DE-195 42 732 A1 discloses a method for recognizing misuse of an access authorization, particularly in mobile radiotelephone systems, whereby variable data transmitted for identification that are transmitted before every interaction are at least partially overwritten by new data in every interactive, new data is generated by an evaluation means and being transmitted to a storage medium and is required as new key word for the identification by the evaluation/decision means in the next interaction.

SUMMARY OF THE INVENTION

The object underlying the invention is comprised in re-subscribing cordless mobile parts at cordless base stations of universal mobile telecommunication systems, particularly DECT mobile parts at DECT base stations of CAP-specific telecommunication systems, without great outlay.

In general terms the present invention is a method for controlling the logon of cordless mobile parts at cordless base stations of universal mobile telecommunication systems, particularly of DECT mobile parts at DECT base stations of CAP-specific telecommunication systems. The cordless mobile parts are logged on at the cordless base stations by logon procedures sequencing over air interfaces according to an air interface-specific protocol. Logon-specific data is stored given logon of the cordless mobile parts. The stored, logon-specific data is copied, given re-logon of the cordless mobile parts, such that the logon-specific data is redundantly present. The copied data is at least partly processed during a re-logon procedure for modifying access-specific parameters of the cordless mobile part that belong to the data. The copied, at least partly processed, re-logon-specific data is stored as new logon-specific data.

In an advantageous development of the present invention the re-logon is initiated by the cordless base stations.

The idea underlying the invention is comprised in re-subscribing cordless mobile parts at cordless base stations of universal mobile telecommunication systems, particularly DECT mobile parts at DECT base stations of CAP-specific telecommunication systems, without great outlay in that the stored, logon-specific data resulting from a preceding logon are copied, the copied data are subsequently at least partly processed, and the copied, at least partly processed data are stored as re-subscription-specific data.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
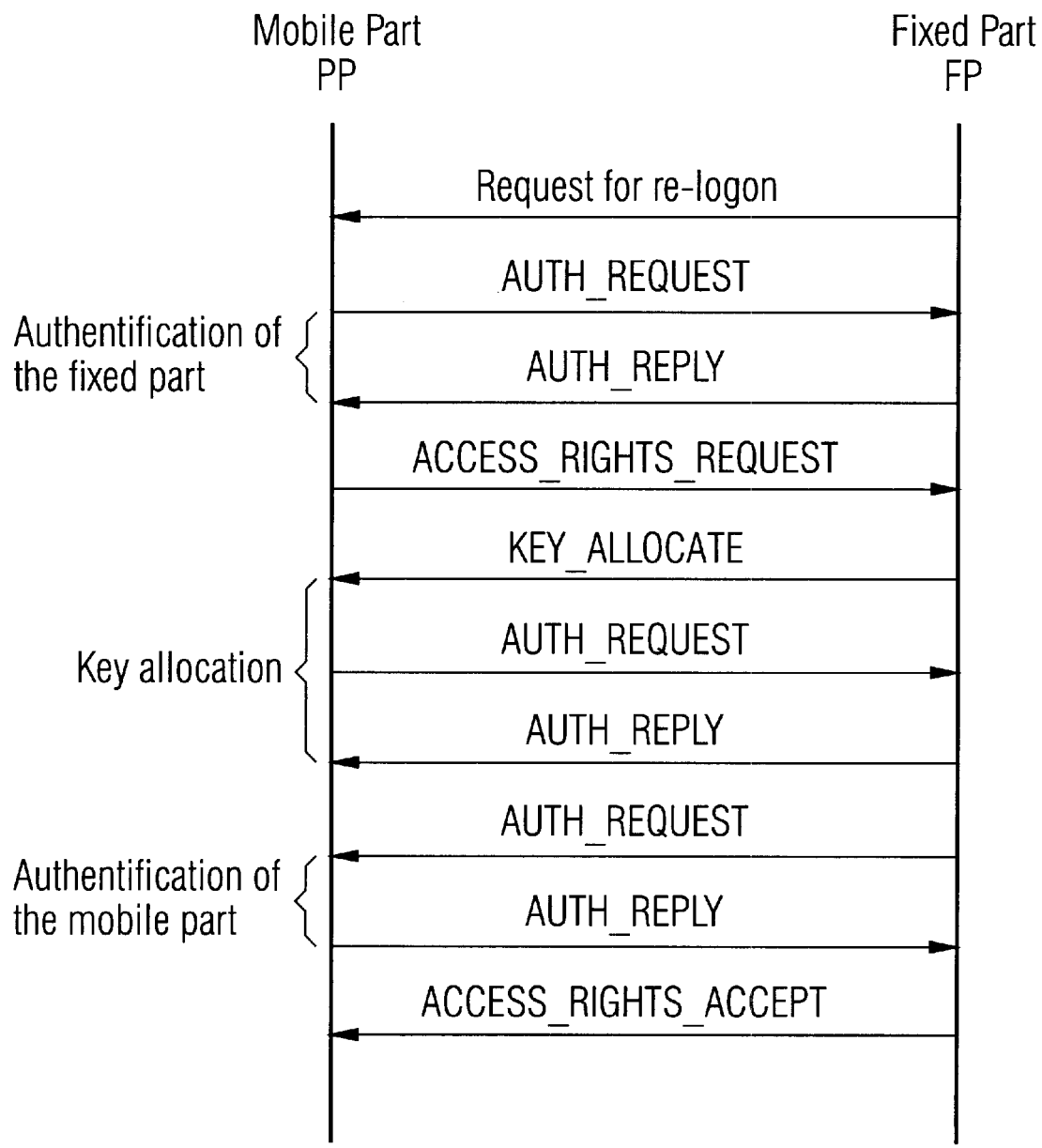
FIG. 1 depicts a logon procedure.
Figure 2:
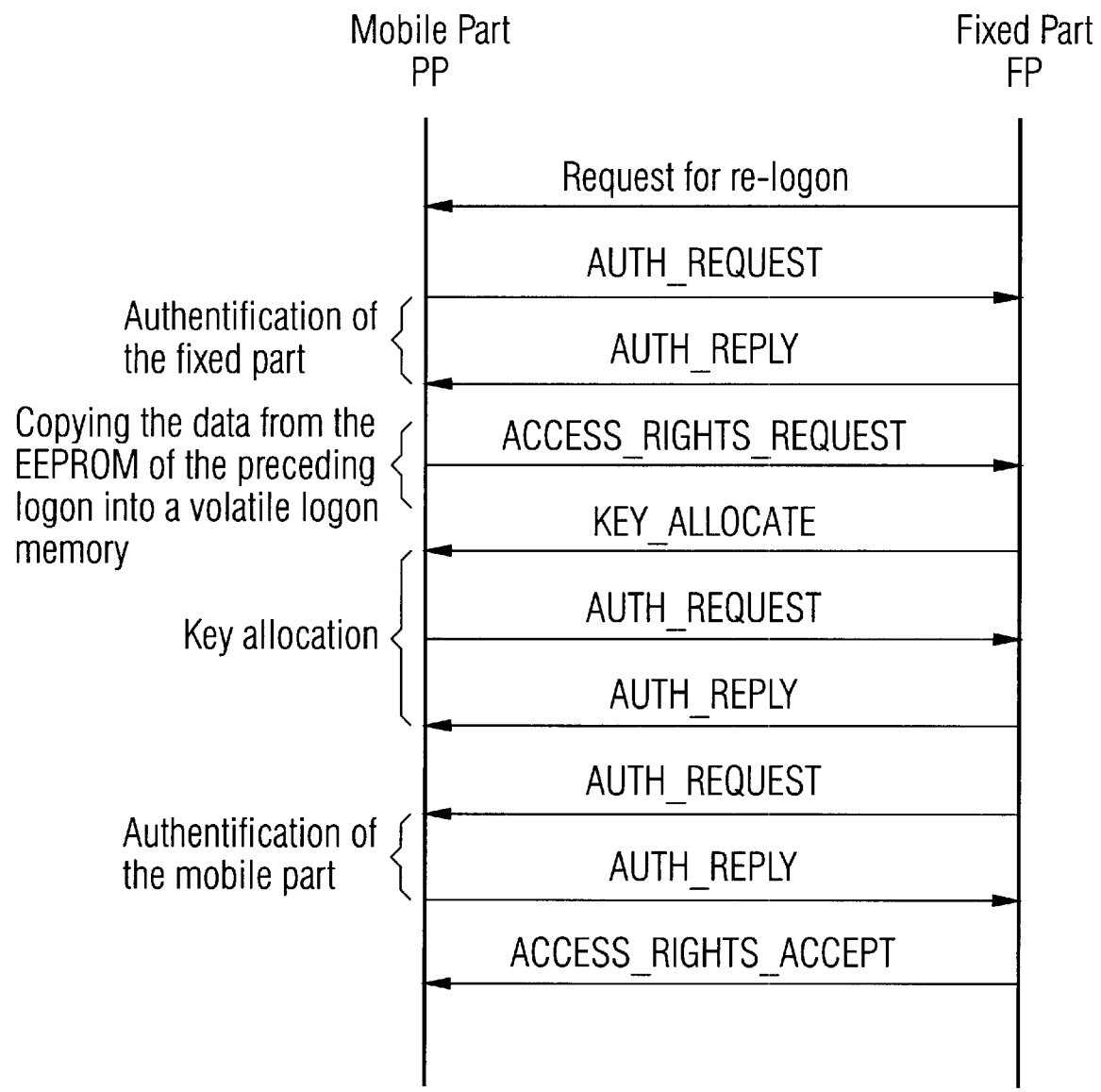
FIG. 2 depicts an exemplary embodiment of the present invention.

Proceeding from FIG. 1, FIG. 2 shows how, following the sub-procedure "authentification of the fixed part and preceding the sub-procedure "key allocation", the mobile part PP copies the data from the preceding logon procedure stored in the non-volatile memory (for example, the EEPROM) into a volatile logon memory for modifications by the fixed part FP.

In addition to the access authorization-specific parameters (PARK, IPUI, PLI, etc.) already mentioned with the description of FIG. 1, these data also include an AC word (authentification code; see ETSI Publication ETS 300175-7, October 1992, Ch. 4.4.3.1., Point 3)) fashioned as PIN word to be input by the user of the mobile part PP upon initial logon or, respectively, a UAK word (User Authentification Key; see ETSI Publication ETS 300175-7, October 1992, Ch. 4.4.3.1., Point 1) and FIG. 1 in Ch. 4.5., 4.6. and 5.) calculated from the AC word. The starting situation given an initial logon of the mobile part PP at the fixed part FP is that the AC word is stored in the fixed part FP as system-specific PIN word (relating to the mobile and fixed part) and is input and stored in the mobile part PP.

When the UAK word according to ETSI Publication ETS 300175-7, October 1992, FIG. 1 in Ch. 4.5., 4.6. and 5 has been calculated in the fixed part FP as well as in the mobile part PP in the preceding logon (for example, the initial logon), for example after the input and storing of the AC word due to the message "KEY_ALLOCATE" [see ETSI Publication ETS 300175-5, October 1992, Ch. 13.6] transmitted from the fixed part FP to the mobile part PP, the stored AC word is replaced by the UAK word in the fixed part FP and mobile part PP. When, by contrast, the UAK word is not calculated—which is also alternatively possible—, then the AC word remains stored unmodified in the fixed part FP and mobile part PP. When, following the initial logon (preceding logon), the fixed part FP starts a re-logon procedure (re-subscription procedure) according to FIG. 2 and when, differing from the comments about FIG. 1, the stored are neither deleted in the fixed part FP and mobile part PP nor, differing from FIG. 2, are copied in the mobile part PP, then a partial modification by the fixed part FP of a datum non-volatilely stored in the mobile part PP retained in the volatile memory that is pursued, in particular, with the re-subscription procedure leads, taking this modification in the non-volatile memory of the mobile part PP into consideration, to the loss of all data previously stored in the non-volatile memory. In order to prevent this, the dataset resulting from the preceding logon and stored in the non-volatile memory of the mobile part PP—as already mentioned above—is copied into the volatile memory for modifications intended by the fixed part with the re-subscription procedure.

In that the data are redundantly present in the meantime, the fixed part FP can now designationally modify the initially indicated data (identifications) without having to repeat all sub-procedures—as given the procedure according to FIG. 1. When the data have been correspondingly modified by the fixed part FP after the re-logon procedure, then the content of the logon memory (preferably a data mix from two successive logon procedures) is transferred into the non-volatile memory (for example, the EEPROM).

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for controlling logon of cordless mobile parts at cordless base stations of universal mobile telecommunication systems, comprising the steps of:

logging on a cordless mobile part at a cordless base station by logon procedures sequencing over air interfaces according to an air interface-specific protocol;

storing logon-specific data in a non-volatile memory of the cordless mobile part, given logon of the cordless mobile part;

copying the stored, logon-specific data into a volatile memory of the cordless mobile part, given re-logon of the cordless mobile part, such that the logon-specific data is redundantly present in the cordless mobile part;

at least partly processing the copied data during a re-logon procedure for modifying access-specific parameters of the cordless mobile part that are associated with the data; and storing the copied, at least partly processed, re-logon-specific data as new logon-specific data in the non-volatile memory.

2. The method according to claim 1, wherein the re-logon is initiated by the cordless base stations.

3. The method according to claim 1, wherein the mobile parts and base stations are DECT mobile parts and DECT base stations, respectively, of CAP-specific telecommunications systems.

4. The method according to claim 1, wherein said logon-specific data comprises an authetification code or a user authentification key.

* * * * *